(12) United States Patent
Cheng et al.

(10) Patent No.: US 6,211,878 B1
(45) Date of Patent: Apr. 3, 2001

(54) METHOD AND APPARATUS FOR INTERACTING AND SELECTING INFORMATION ON A VIDEO DEVICE

(75) Inventors: Po-wen Cheng, Jia-Lii; Jyhhwa Ferng, Taichung; Wen-Chiuan Liao, Hsinchu; Jeng-Weei Lin, Taipei; Tai-Yuan Wang, Fieng Shan, all of (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/192,277

(22) Filed: Nov. 16, 1998

(30) Foreign Application Priority Data

Aug. 18, 1998 (TW) .................................................. 87213506

(51) Int. Cl.$^7$ ................. G06F 3/14; G06F 3/02
(52) U.S. Cl. .................. 345/357; 345/341; 345/339; 345/169; 707/501; 348/734
(58) Field of Search .................. 345/357, 339, 345/341, 352, 327, 123, 169, 184, 156, 329; 707/501, 513; 348/734, 552; 709/203, 201

(56) References Cited

U.S. PATENT DOCUMENTS

| | | | |
|---|---|---|---|
| 5,510,811 | * 4/1996 | Tobey et al. ................... | 345/169 X |
| 5,530,455 | 6/1996 | Gillick et al. ................... | 345/123 X |
| 5,724,106 | 3/1998 | Autrey et al. ................... | 348/734 |
| 5,854,624 | * 12/1998 | Grant ............................. | 345/169 |
| 5,892,498 | * 4/1999 | Marshall et al. ................ | 345/123 |
| 6,005,563 | * 12/1999 | White et al. .................... | 345/327 |
| 6,034,689 | * 3/2000 | White et al. .................... | 345/357 |
| 6,075,575 | * 6/2000 | Schein et al. ................... | 348/734 |

FOREIGN PATENT DOCUMENTS 330710    4/1998    (TW) .............................. G06F/3/033

* cited by examiner

Primary Examiner—Raymond J. Bayerl
(74) Attorney, Agent, or Firm—Birch, Stewart, Kolasch & Birch, LLP

(57) ABSTRACT

A method and apparatus for interacting and selecting information on a video device employs a remote control unit which has a plurality of user interface devices. The user interface devices control information flow on the video device in a predetermined manner. The method and apparatus for interacting with information on the video device directly interacts with Hypertext Markup Language (HTML) tags without the need of a graphical mouse pointer on the video device.

33 Claims, 14 Drawing Sheets

HTML'S FORM STRUCTURE

FIRST NAME: [                                      ]

COUNTRY: [ PLEASE SELECT (LISTED ALPHABETICALLY) ▽ ]

○ YES    ○ NO

☐ C++    ☐ VISUAL BASIC

SUBMIT    RESET

CONVENTIONL ART

METHOD AND APPARATUS FOR INTERACTING AND SELECTING INFORMATION ON A VIDEO DEVICE

BACKGROUND OF THE INVENTION

1. Field of the Invention

The present invention relates to a method and apparatus for interacting and selecting information on a video device. The method and apparatus employ a remote control unit which has a plurality of user interface devices disposed thereon which controls information on the video device in a predetermined manner. The method and apparatus for interacting with information on the video device directly interacts with Hypertext Markup Language (HTML) tags without a mouse pointer.

2. Description of the Background Art

Mouse devices exist for selecting information such as hypertext markup language (HTML) tags that are present on the World Wide Web (WWW) or internet. Such mouse devices of the conventional art require a graphical pointer displayed on the video device or screen in order to select the HTML tags. Such mouse devices make controlling of the pointer on the video device very difficult and in many instances, when the user is located at a significant distance from the video device, control of the graphical pointer becomes significantly more difficult. Furthermore, rapid advancing or regressing of information on the video screen of the conventional art is also very difficult due to the large amount of movement across the video device required by the mouse pointer.

While some mouse devices of the conventional art have attempted to increase the rate at which information moves across a video device by employing a scrolling mechanism disposed on the mouse device, the user of the mouse device is still required to accurately position a graphical mouse pointer in regions of the screen which are substantially small. A further drawback of the prior art is that many of the mouse devices require a substantially planar rolling surface in which the graphical pointer can be controlled by the user. In other prior art devices which include "track ball" type mouse devices, positioning of the mouse pointer becomes very tedious due to the sensitivity of the "track ball" relative to the movement of the user's finger or thumb.

With the internet age fast approaching society, web browsers have become useful tools for searching and acquiring information. "Web Surfing" is not only an important way to get knowledge and exchange information but it is now a way to relax and a provides a means of enjoyment for users. With the mouse devices of the prior art, the advantages of the internet and world wide web cannot be fully appreciated by the users.

As seen in FIG. 19, a mouse device 10 of the conventional art is shown. The mouse device 10 includes buttons 12 which activate functions of a mouse pointer 20 (shown in FIG. 20). The mouse device 10 further includes scrolling wheels 14 as well as cable or wire 16 that directly connects to a CPU (not shown). The prior art mouse device 10 is required to be operated upon a planar surface 18 so that movement of the mouse device 10 across the planar surface 18 will cause a ball mechanism 22 to rotate. The mouse device 10 is designed for computer based applications where a user will typically be located adjacent to a video device such as a cathode-ray tube device (not shown). Typically a user will be separated away from the video device by a distance which is substantially less than three feet. Such a short distance permits the user to easily track the mouse pointer 20 which moves in accordance with the relative movement of the ball 22.

As seen in FIG. 20, the mouse pointer 20 in a windows based web browser is used to interact with information on a computer screen 24. Significant hand movement is required by the user to move the mouse pointer 20 to various points on the computer screen 24. Furthermore, at distances greater than three feet from the computer screen 24, tracking or viewing movement of the mouse pointer 20 becomes very difficult due to the limited vision capabilities of the user. Furthermore, at distances greater than three feet from the computer screen 24, a significant amount of cabling or wiring 26 (see FIG. 19) will be required to permit the user to be spaced at such a distance from the computer screen 24.

Accordingly, a need in the art exists for a method and apparatus for interacting with information on a video device that can advance and regress through information without the need to control a graphical mouse pointer. A further need exists in the art for a method and apparatus for interacting with information on a video device which employs a remote control unit that has a plurality of unit user interface devices which manipulate information on a video device without a graphical mouse pointer.

SUMMARY OF THE INVENTION

Accordingly, it is a primary object of the present invention to provide a method and apparatus for interacting with information on a video device that does not require the use of a graphical mouse pointer which is present on the video device.

It is a further object of the present invention to provide a method and apparatus for interacting with information on a video device that can select information, scroll through information, advance through information in a page format, advance through information incrementally, and regress through information incrementally without the use of a graphical mouse pointer.

An additional object of the present invention is to provide a method and apparatus for interacting with information on a video device which includes a remote control unit which includes a plurality of interface devices that select HTML tags on a web page.

A further object of the present invention is to provide a method and apparatus for interacting with information on a video device where the apparatus can mark or manipulate information such as hyperlinks, frames, pages, forms, and image maps located on the video device.

Another object of the present invention is to provide a method and apparatus for interacting with information on a video device where once information is selected, the appearance of the information will be changed and emphasized automatically, such as being enlarged, changed, colored or outlined by a graphical box.

Another object of the present invention is to provide a method and apparatus for interacting with information on a video device where several functions on a web browser can be activated each at one time by pressing a button. Such functions can include, but are not limited to, linking, scrolling, back, stop, initiating a hyperlink, marking or selecting a frame, or advancing or regressing in a page format.

A further object of the present invention is to provide a method and apparatus for interacting with information on a video device which includes a driver program for a remote control unit which can interact with information without having to utilize a graphical interface such as a mouse pointer or cursor.

A further object of the present invention is to provide a method and apparatus for interacting with information on a video device which includes a remote control unit that interacts with the web browser where a television screen is used as a video device.

Another object of the present invention is to provide a method and apparatus for interacting with information on a video device that substantially increases web browser efficiency, while eliminating the difficulty caused by mouse clicking and remote operation relative to the video device.

A further object of the present invention is to provide a method and apparatus for interacting with information on a video device that includes a remote controller that is suitable for use in the home and which uses a TV screen which in turn substantially increases the efficiency between a user and a web browser.

These and other objects of the present invention are fulfilled by providing a method for interacting with information on a video device without a mouse pointer, the method comprising the steps of: a remote control unit; a video device; a computer, the computer being operatively linked to the remote control unit via an interface; a first user interface device disposed on the remote control unit, the first user interface device generating a signal upon actuation that activates information displayed on the video device outputted by the computer; a second user interface device disposed on the remote control unit, the second user interface device generating a signal upon actuation that selects information displayed on the video device outputted by the computer; a third user interface device disposed on the remote control unit, the third user interface device generating a signal upon actuation that scrolls information on the video device outputted by the computer; a fourth user interface device disposed on the remote control unit, the fourth user interface device generating a signal upon actuation that advances information in a page format on the video device outputted by the computer; a fifth user interface device disposed on the remote control unit, the fifth user interface device generating a signal upon actuation that regresses information in a page format on the video device outputted by the computer; a sixth user interface device disposed on the remote control unit, the sixth user interface device generating a signal upon actuation that advances information incrementally on the video device outputted by the computer; and a seventh user interface device disposed on the remote control unit, the seventh user interface device generating a signal upon actuation that regresses information incrementally on the video device outputted by the computer, whereby efficiency in remote operation of a computer program which outputs information on the video device is so device is a television set.

In addition these and other objects of the present invention are also accomplished by an apparatus for interacting with information on the video device comprising: detecting the activation of a user interface device on a remote control unit; activating information displayed on the video if a first interface device is actuated; selecting information displayed on the video device if a second interface device is actuated; scrolling through information on the video device by activating if a third interface device is actuated; advancing through information in a page format if a fourth interface device is actuated; regressing through information in a page format if a fifth interface device is actuated; advancing through information incrementally if a sixth interface device is actuated; and regressing through information incrementally if a seventh interface device is activated, whereby efficiency in remote operation of the computer program which provides the information on the video device is substantially increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
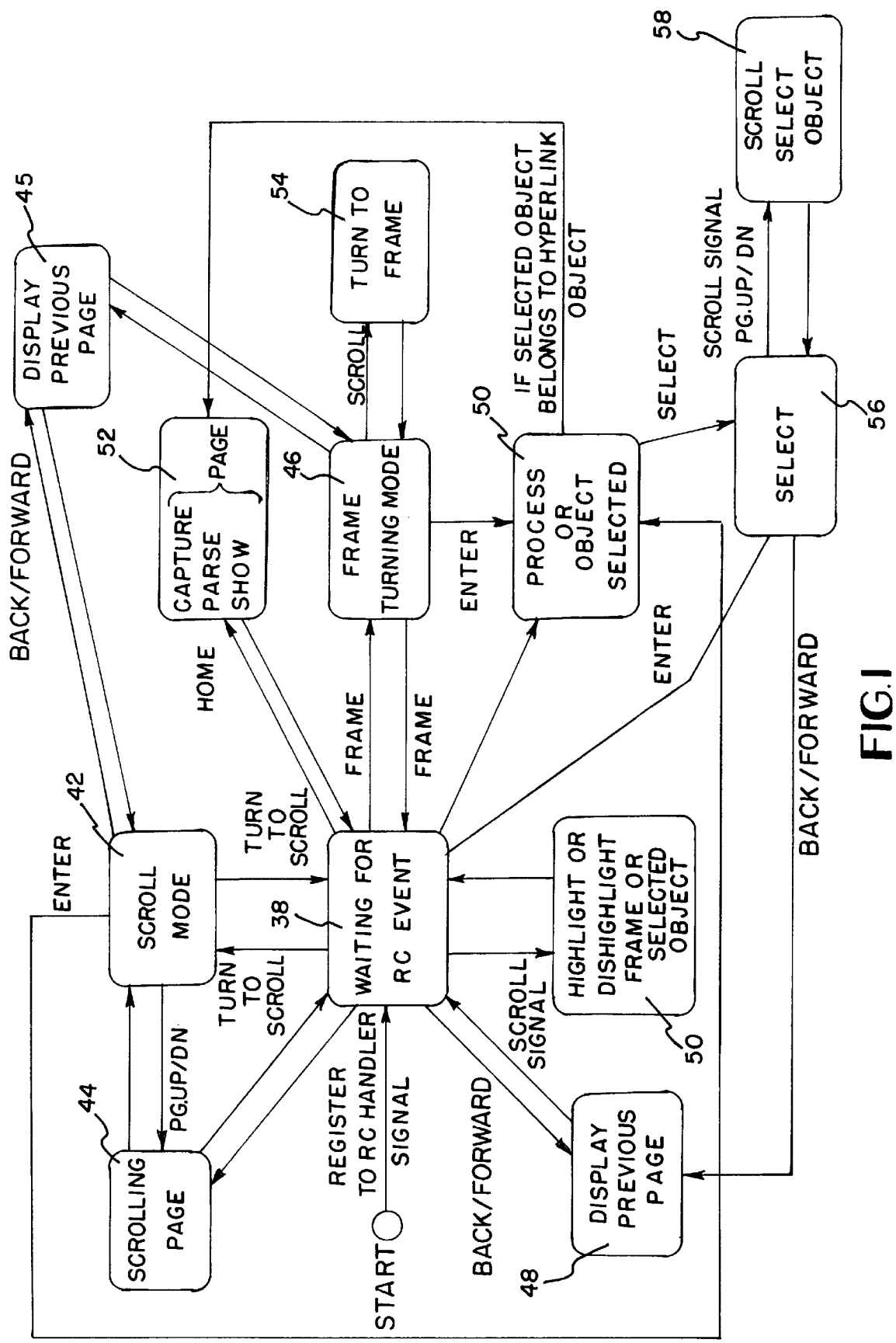
FIG. 1 shows the flowchart of receiving and processing signals from a remote control unit to interact with information on a video device which interfaces with a web browser program.
Figure 2:
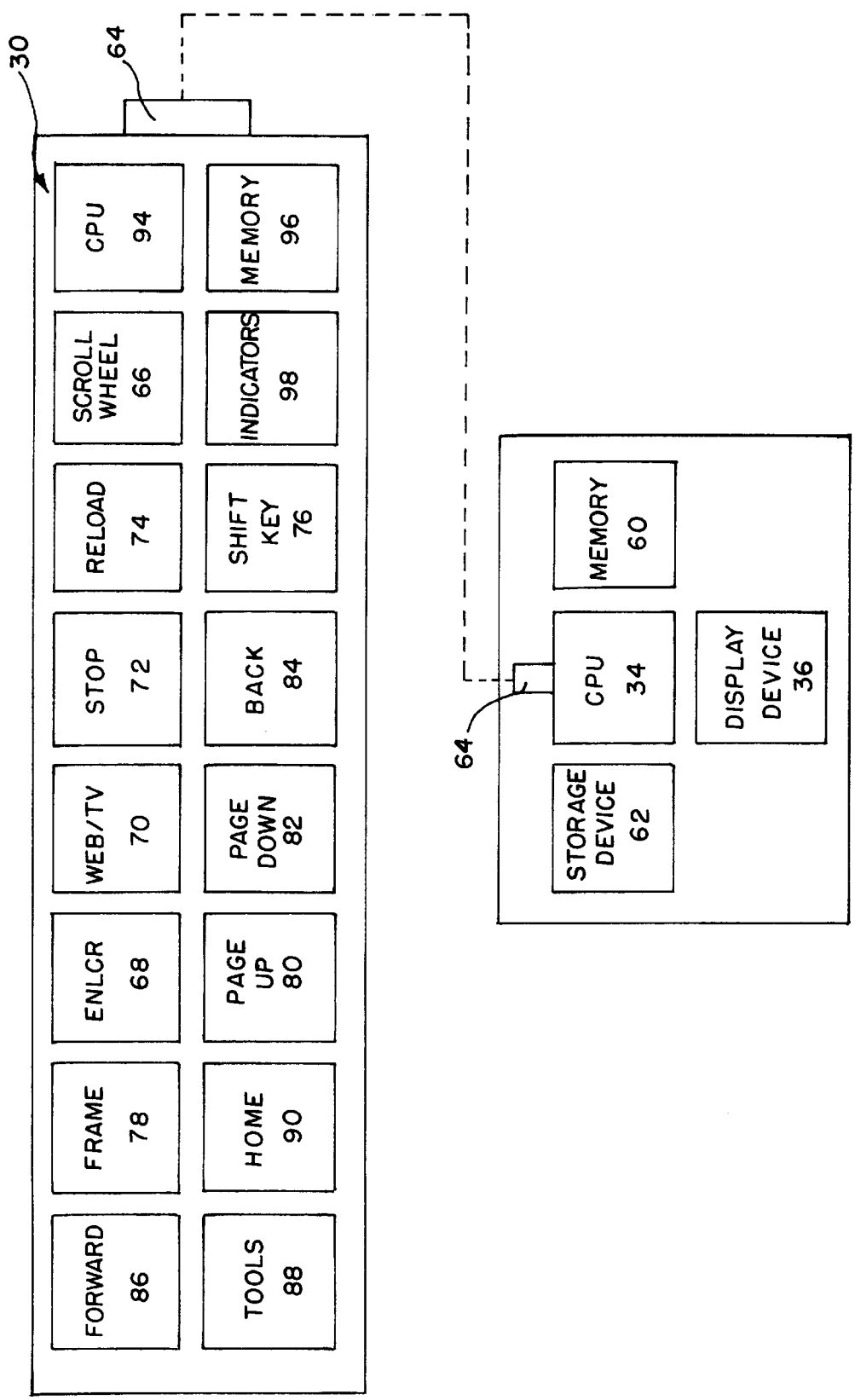
FIG. 2 is a block diagram of a remote control unit according to one preferred embodiment of the present invention.

Referring in detail to the drawings and with particular reference to FIG. 1, a method of selecting and interacting with information on a video device is shown. The method includes several steps which are dependent on the activation of several user interface devices on a remote control unit and a computer program. The method and apparatus for selecting and interacting with information on a video device of the present invention is preferably designed for computer based applications which include web browsers that are designed for using a television as the video device. It is contemplated that the method and apparatus for selecting and interacting with information on a video device will further include a remote control unit 30 (as seen in FIG. 2) that is operatively linked to a computer or central processing unit (CPU) that implements the programming scheme on a video device such as a television 36.

It is further contemplated that the remote control unit 30 will be operatively linked to the CPU via a wireless link such as radio frequency (RF) waves, inductive coupling, capacitive coupling, infrared rays, or other like communications mediums. While the present invention is preferably designed for web browser computer applications that utilize hypertext markup language (HTML), other types of markup languages are not beyond the scope of the present invention. Other types of markup languages include, but are not limited to, standard general markup language (SGML), extensible markup language (XML), and virtual reality modeling language (VRML).

The method of the present invention employs the programming language JAVA™ (object orienting programming language) to carry out many of the browser's functions. However, the present invention is not limited to the JAVA™ programming language. The present invention is designed for object-oriented languages that will run on any platform. An object-oriented language is defined as a method of software-development that groups related functions and data into reusable chunks. When properly handled, object-oriented programming can reduce development time on new projects. The present invention can employ other object-oriented languages such as JAVA™ script, and languages used to support JAVABEANS (object oriented programming language).

It is noted that JAVABEANS is a component technology for JAVA™ but lets developers create reusable software objects. Such objects can be shared for example, where a database vendor can create a JAVABEAN to support its software, and other developers can easily drop the bean into their own project.

FIG. 1 shows a flowchart for a programming scheme of receiving and processing a remote control signal from a remote control unit 30 of a web browser. Block 38 shows the status of a remote control driver which is waiting for a remote control (RC) event or signal from the remote control unit 30. Further details of the remote controller driver 40 are discussed with reference to FIG. 11 below. The arrows extending from block 38 represent predefined signals which correspond to activation or actuation of individual user interface devices or buttons on the remote control unit 30.

Upon receiving a scroll signal, the web browser enters a scroll mode 42. While in scroll mode 42, the web browser may advance or regress through information on a web page according to a relative rotation of a user interface device such as a wheel or upon receiving a signal pulse from the activation of a single user interface device such as a button. For example, while in scroll mode, a user interface device such a button prescribed for a specific web based function, like an "enter" command may be employed. Other examples include user interface devices or buttons that are designed for page up and page down functions, backward and forward movement of highlighted or selected text, or frame advance for a web browser.

Box 44 denotes a scrolling page mode of the web browser which can be activated by either using a scroll button or a combination of rotation of a scroll wheel and an activation of a page up or page down button. Box 46 denotes a display previous page mode which can be activated by signals from a back or forward button or a combination of the web browser previously being in a frame turning mode as denoted by box 46 and generation of a scroll signal from either a scroll button or scroll wheel. Box 48 shows the web browser in a display previous page mode which is activated by a backward or forward button from the waiting for the RC event mode 38.

Box 50 denotes the web browser in a highlight or unhighlight web page object mode for a selected frame which is a result of a scroll signal that is received during the waiting for RC event mode 38 of the web browser program. Box 50 denotes a process or object being selected mode as a result of a signal being generated by an enter key. If the process or object selected in this mode 50 belongs to a hyperlink object, then the web browser will go into the mode denoted by box 52 which is a capture page/parse page/show page mode. Box or mode 52 can be activated by also receiving a signal from a home button or user interface device.

Box 46 denotes a frame mode which is activated upon a signal received from a user interface device such as a frame button. Once in the frame turning mode 46, a user can move through frames of the web page or to scroll by displaying previous pages of the web page document. The frame turning mode can be deactivated by pressing the frame button after its initial depression or activation.

Box 54 denotes the advancing or regression of frames due to a scrolling signal when the web browser is in a frame turning mode 46.

When the web browser is in the process or object selected mode 50, it is possible that the object belongs to a series of other objects on the web page. Therefore, if the enter key is selected again, the object or process selected can be opened as indicated in the open select object mode 56. If the selected opened object further includes other text or other objects, the user can move through information by either utilizing the page up or page down, scrolling keys, or forward or backward buttons. If the user employs the scroll wheel, page up, or page down buttons while in the open select object mode, the web browser will enter into a scroll select object mode as denoted by box 58.

As seen in FIG. 2, a block diagram or schematic of the apparatus for selecting information on a video device 36 is shown. As stated above, the video device is preferably a television set. However, other video devices are not beyond the present invention. Other video devices include, but are not limited to cathode-ray tubes (CRTs) for computer screens, liquid crystal displays, (LCD), and other like video devices.

The CPU 34 preferably has access to volatile/and/or non-volatile memory 60. The CPU 34 also has access to a storage device 62 such as a disk drive or CD ROM. The CPU 34 is operatively linked to the remote control unit by coupling devices 64. Coupling devices 64 are preferably RF communication systems that include respective RF modules.

However, other coupling devices 64 are not beyond the scope of the present invention. Other coupling devices include, but are not limited to, capacitive coupling devices, inductive coupling devices, infrared coupling devices, magnetic coupling devices, and other like devices which provide for wireless interaction between a CPU 34 and a remote control unit 30.

Remote control unit 30 includes several user interface devices that are designed to activate specific functions of a web browser program environment. Specifically, remote control unit 30 includes a scroll wheel 66, and an enter button 68. The scroll wheel 66 permits the user to scroll through information by highlighted text, or framed text. The scroll wheel 66 permits the user to place the web browser into the scroll mode 42 or highlight or unhighlight frame mode 50 as discussed above with reference to FIG. 1. While the scroll wheel 66 is preferably a dial or a wheel, other user interface devices which activate scrolling are not beyond the scope of the present invention. Other user interface devices include, but are not limited to, manually actuated buttons, keypad devices, and other like devices which respond to the touch of an object or a user.

Other user interface devices of remote control 30 include a web/TV menu switch 70, a stop switch 72, a reload switch 74, a shift switch 76, a frame switch 78, a page up switch 80, a page down switch 82, a back switch 84, a forward switch 86, a tools switch 88, and a home switch 90. The switches of the user interface devices can typically the form as manually actuated buttons. However, the present invention is not limited to the mechanical configuration of buttons. Other types of switches include, but are not limited to, touch key pad type switches, lever switches., and other like pressure sensitive mechanical or electrical actuated switches.

The stop switch 72 produces a signal that instructs a web browser to stop loading information for a web page. The reload switch 74 is designed to send a signal to the web browser implemented by a CPU 34 in order to reload a web page in its entirety.

The shift switch 76, the frame switch 78, the page up switch 80, page down switch 82, back switch 84 and forward switch 86 are designed to send signals to the CPU 34 in order to initiate the relative web browser modes discussed above which include the scrolling page mode 44, the scroll mode 42, the frame mode 46, the highlight or unhighlight web page object mode 50, and display previous page modes 45, 48. The remote control unit 30 can further include its own CPU 94 and a volatile and/or non-volatile memory device 96. The remote control unit can further include visual indicators 98 which provide information to the user as to the status of the remote control unit 30 and/or the CPU 34 of the web browser. The indicators 98 are preferably light emitting diodes (LEDs), but other visual indicators are not beyond the scope of the present invention. Other visual indicators include, but are not limited to, liquid crystal displays (LCDs), miniature video devices, and light indicators.

Figure 3:
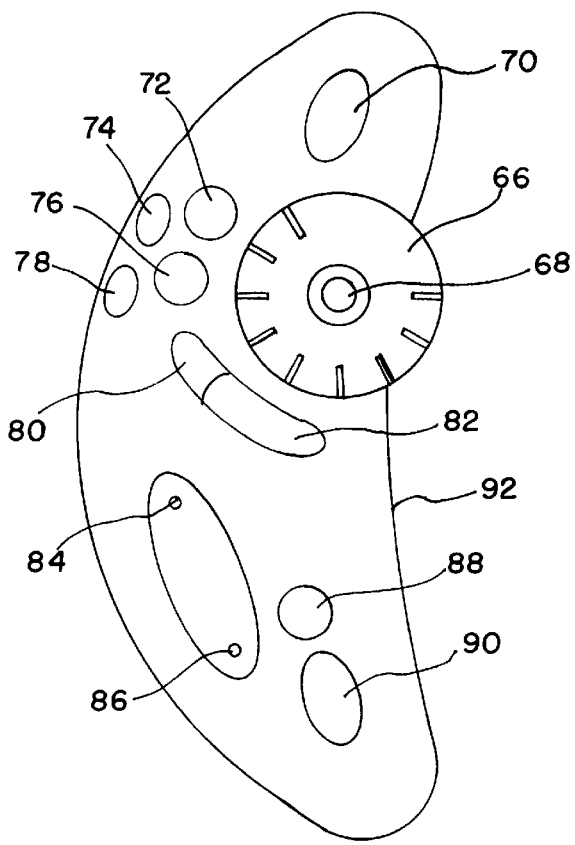
FIG. 3 shows a perspective view of the relative size and shape of one embodiment of a remote control unit of the present invention.

In FIG. 3, the spatial relationship between the user interface devices is shown. The remote control unit 30 preferably includes a contoured housing 92 which permits a user to readily select the desired switches 66–90 which interact the CPU 34 of the web browser. Several of the switches are contoured to provide easy manipulation of the switches.

Figure 4:
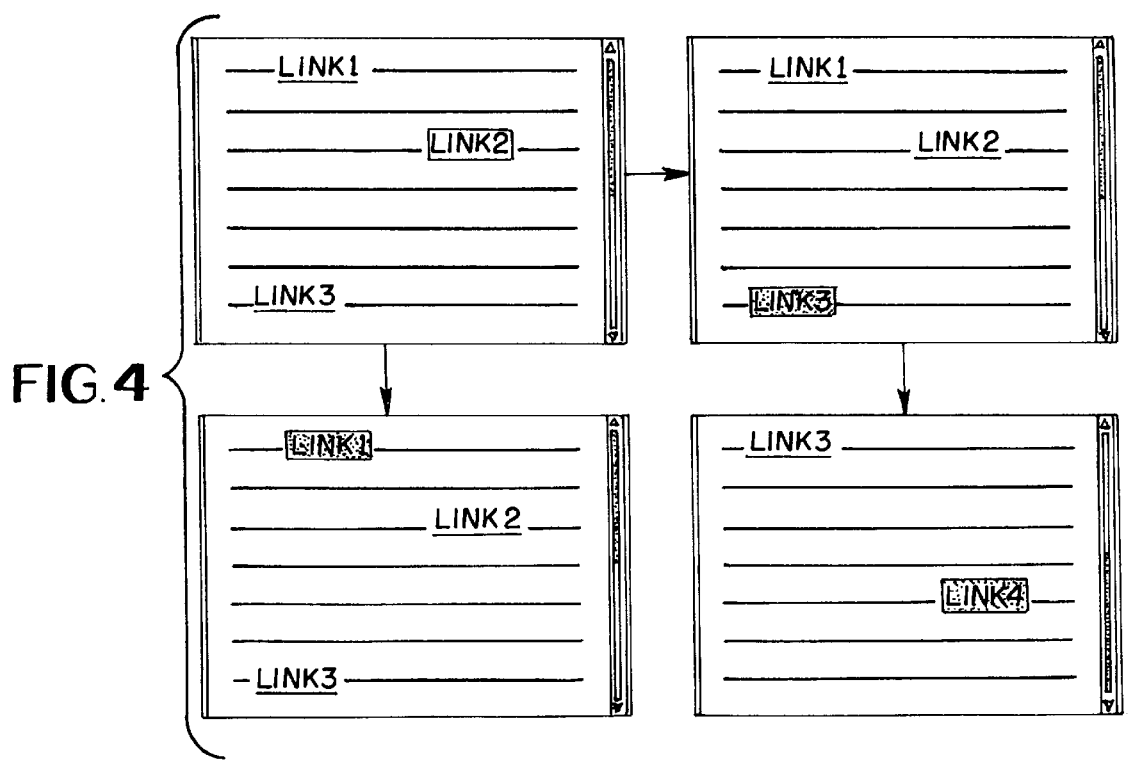
FIG. 4 shows an exemplary textual web page that contains hyperlinks which are activated directly with user interfaces of a remote control unit of the present invention.

In FIG. 4, an exemplary web page is shown which includes hyperlinks in a web page generated by a hypertext markup language (HTML). The hyperlinks are denoted as "link 1", "link 2", "link 3", and "link 4". To move from hyperlink "link 1" to hyperlink "link 2", the user would either activate the scroll switch or scroll wheel 66.

Figure 5:
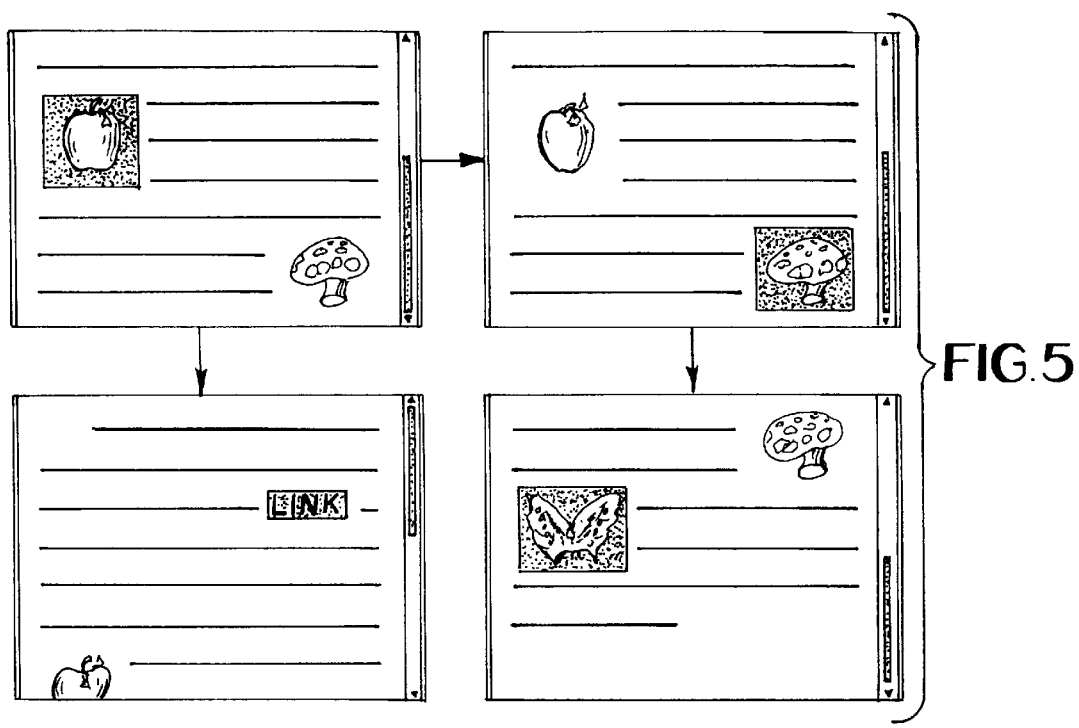
FIG. 5 shows an exemplary web page that contains image hyperlinks that are directly activated by user interfaces on the remote control of the present invention.

In FIG. 5, a web page which includes image hyperlinks as well as a text hyperlink is shown. Similar to the operation in FIG. 4, to move between hyperlink images the user would activate the scroll switch or wheel 66.

Figure 6:
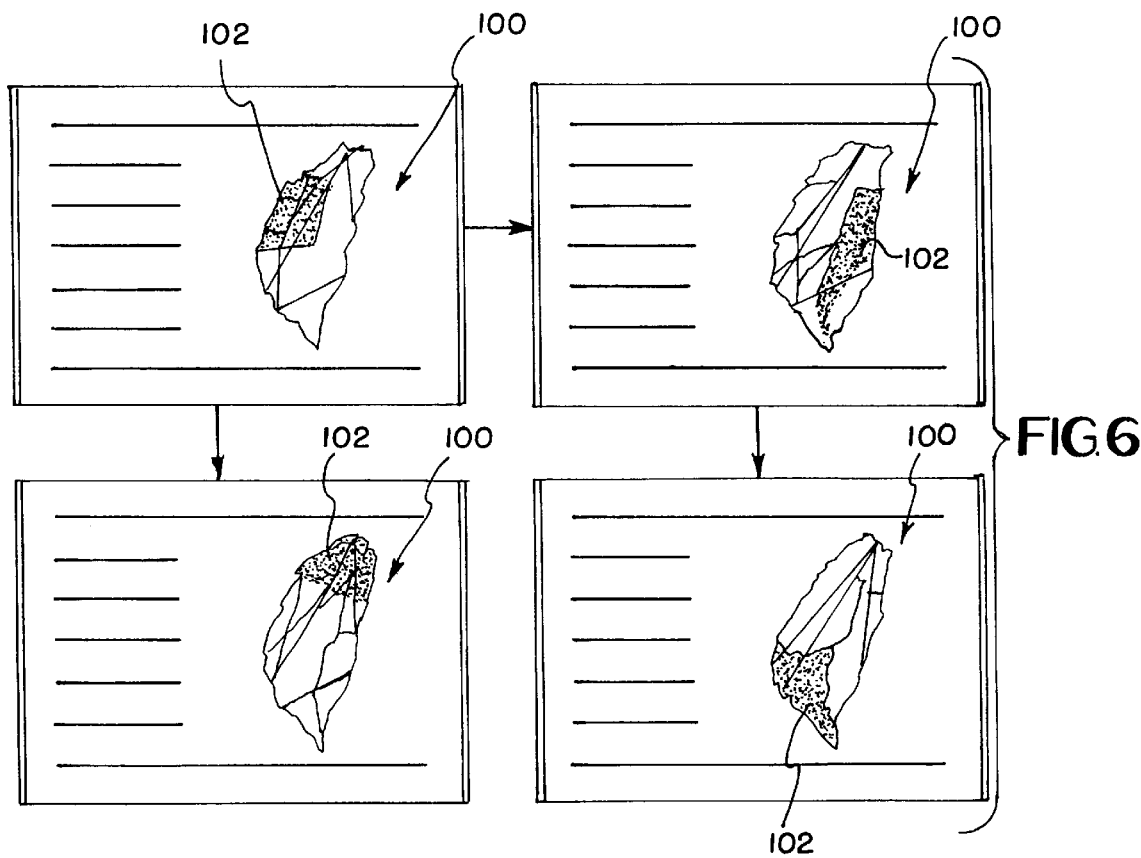
FIG. 6 shows image maps on an exemplary web page which are activated directly by user interface devices on the remote control unit of the present invention.

In FIG. 6, an image map 100 is shown on a web page that is displayed on a video device. The image map 100 includes a plurality of image areas or regions 102. In order to move between respective areas or regions 102, the user of the remote control unit 30 activates the scroll switch or scroll wheel 66.

Figure 7:
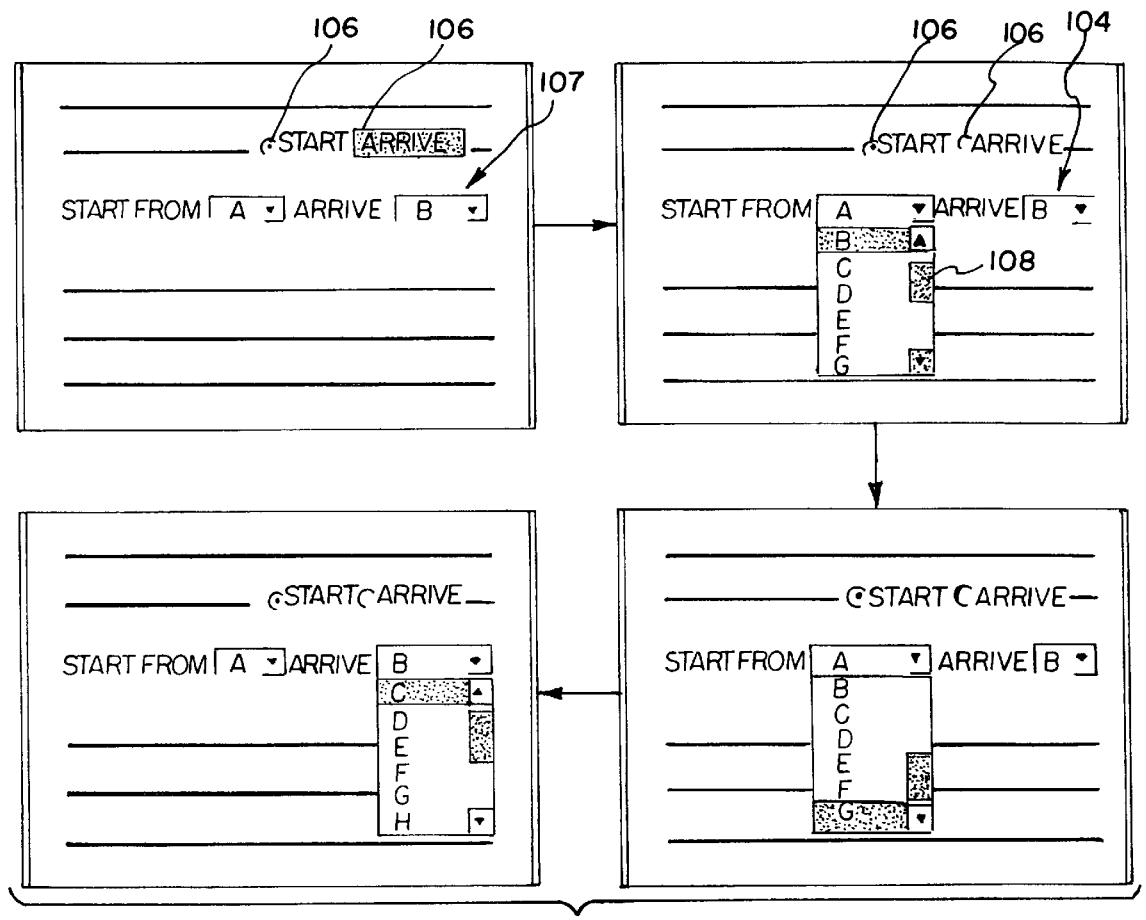
FIG. 7 shows an example on an exemplary web page which is directly activated by user interface devices on the remote control unit of the present invention.

FIG. 7 shows an example of a form 104 on a web page displayed on a video device. Form 104 includes radio type buttons 106 as well as pull down scrolling menus 108. In order to activate the radio buttons 106, the user employs a combination of switches on the remote control unit 30. Such a combination of switches can include the activation of the scroll wheel 66 which causes the web browser to go into a highlight or unhighlight frame mode 50 whereupon the user can activate the radio button 106 by pressing the enter switch or button 68. The pull down scrolling menus 108 are also activated by a respective combination of switches on the remote control unit 30. To select a particular pull down scrolling menus 108, the user activates the scroll switch or scroll wheel 66 also in combination with the enter switch or button 68.

Figure 8:
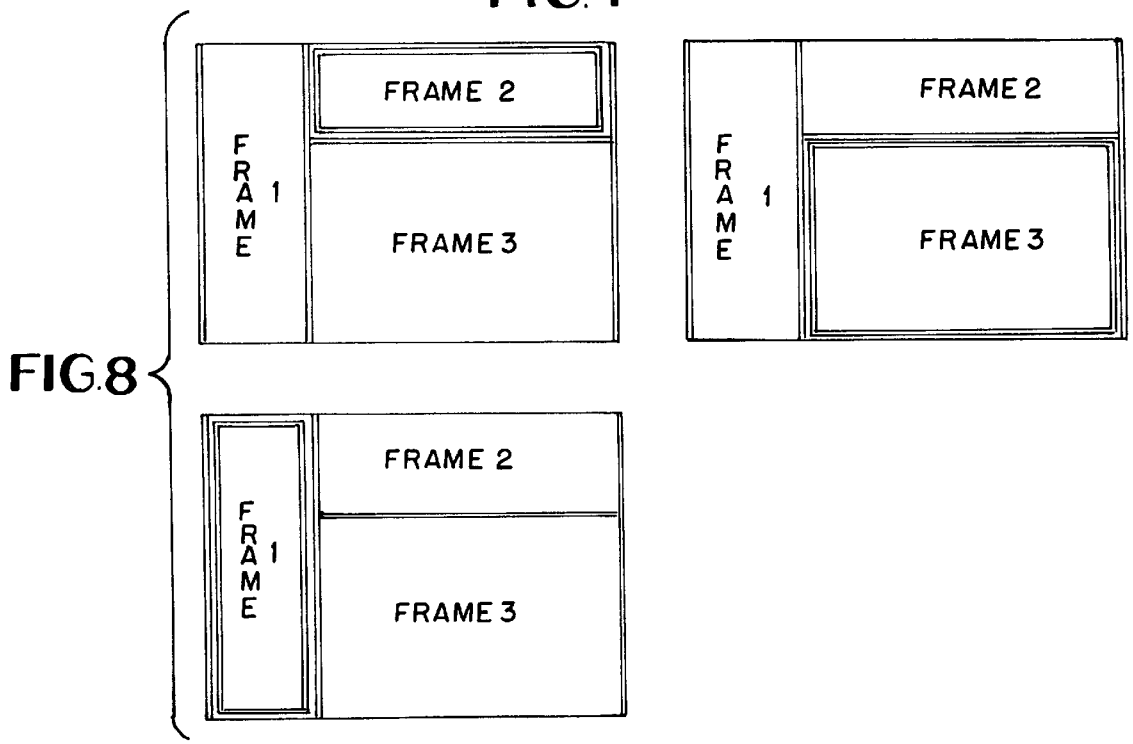
FIG. 8 shows various frames on an exemplary web page that are directly activated by user interface devices on the remote control of the present invention.

In FIG. 8, a series of frames are shown on a web page displayed on a video device. Each frame at a particular point in time is highlighted or selected. The frames are highlighted according to activating the scroll wheel or scroll switch 66 in combination with the frame switch 78. Movement between respective frames occurs when the web browser is in the highlight or unhighlight frame 50 or frame mode 46 as discussed above with respect to FIG. 1.

Figure 9:
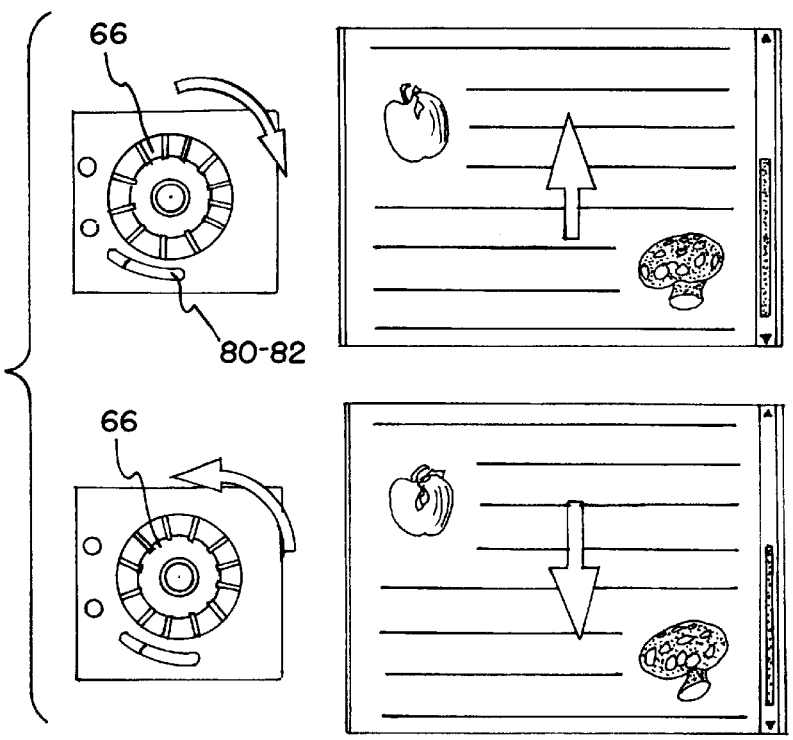
FIG. 9 shows vertical scrolling on an exemplary web page by using a thumb wheel interface device on the remote control of the present invention.

FIG. 9 shows a the respective manipulation of the switches and the relative movement or selection of information on a web page displayed on a video device. As seen in the top portion of FIG. 9, to scroll downward with respect to the images and text on the web page, the user would rotate the scroll wheel or scroll switch 66 in a clockwise direction. To scroll upwards, the user would rotate the scroll wheel or scroll switch 66 in a counterclockwise movement. However, as stated above, while the preferred embodiment includes a scroll wheel 66, the scroll switch is not limited to this embodiment and may include other types of switches such as manually actuated buttons or like structures.

Figure 10:
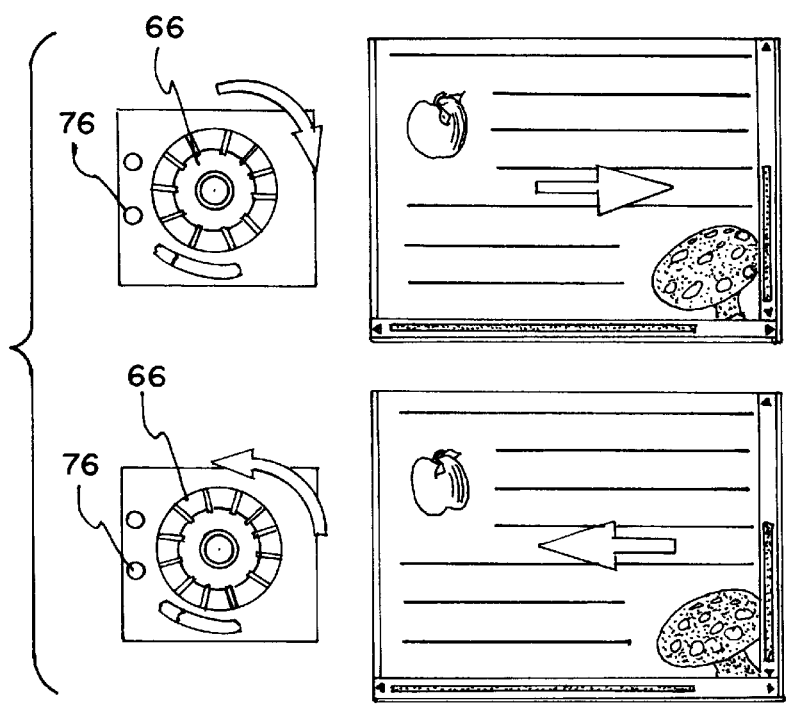
FIG. 10 shows horizontal scrolling on an exemplary web page by using both a thumb wheel and user interface devices on a remote control unit of the present invention.

FIG. 10 shows how to scroll through information in a horizontal direction with respect to the information displayed on a web page on a video device. Horizontal scrolling of a preferred embodiment in the present invention is accomplished by depressing or activating the shift switch 76 in combination with the scroll wheel or scroll switch 66. To move through information in a horizontal direction, the scroll wheel or scroll switch 66 is rotated in a clockwise fashion. To scroll through information in a horizontal direction in a left-ward horizontal direction, the scroll wheel or scroll switch 66 is rotated in a counterclockwise fashion while the shift switch 76 is actuated. The present invention is not limited to these combination of switches and therefore the present invention can include one switch which performs right-ward horizontal scrolling or left-ward horizontal scrolling.

Figure 11:
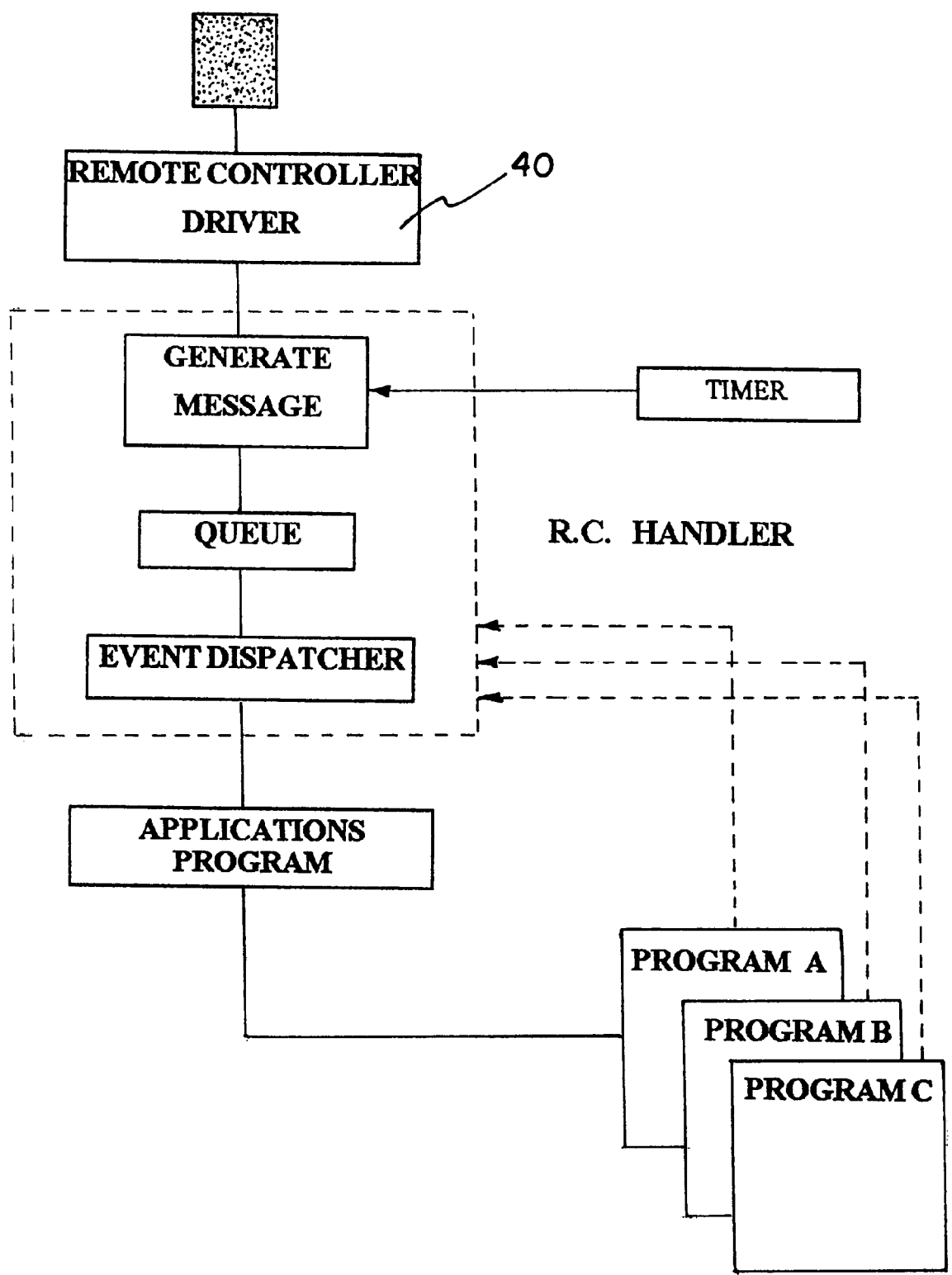
FIG. 11 shows a flowchart of the remote control signal generated by the remote control unit of the present invention.

In FIG. 11, details of the remote controller driver 40 are shown in a flowchart format. Remote controller driver 40 is designed to read signals from the remote controller receiver and to pass data to the remote controller (R.C.) Handler. The R.C. Handler A is a program routine which is executed when an interrupt occurs or signal from the remote controller is received. Interrupt handlers typically deal with low-level events in the hardware of a computer system such as a character arriving at a serial port or a tick of a real-time clock. Special case is required when writing an interrupt handler to ensure that either the interrupt which triggered the handler's execution is masked out (inhibited) until the handler is done, or the handler is written in a re-entrant fashion so that multiple concurrent invocations will not interfere with each other.

If interrupts are masked then the handler must execute as quickly as possible so that important events are not missed. This is often arranged by splitting the processing associated with the event into "upper" and "lower" halves. The lower part is the interrupt handler which masks out further interrupts as required, checks that the appropriate event has occurred (this may be necessary if several events share the same interrupt), services the interrupt, e.g. by reading a character from a UART and writing it to a queue, and re-enabling interrupts.

The upper half executes as part of a user process. It waits until the interrupt handler has run. Normally the operating system is responsible for reactivating a process which is waiting for some low-level event. It detects this by a shared flag or by inspecting a shared queue or by some other synchronization mechanism. It is important that the upper and lower halves do not interfere if an interrupt occurs during the execution of upper half code. This is usually ensured by disabling interrupts during critical sections of code such as removing a character from a queue.

The R.C. Handler of the present invention maintains a queue for the R.C. message packed from the data received from the remote controller driver. The event dispatcher is a thread for dispatching messages in the queue to application programs. The event dispatcher "sleeps" or is in an inactive mode when the queue is empty. The event dispatcher "awakes" or is in an active mode when the R.C. Handler receives data from the R.C. driver, packs data into messages, and inserts the messages into the queue.

Table 1

Public class RCEvent extends java.lang.Object {
   public static final int RC_ENTER='\n';
   public static final int RC_HOME=0×24;
   public static final int RC_VOLUME=0×50;
   public static final int RC_MASTER_MENU=0×51;
   public static final int RC_FRAME=0×52;
   public static final int RC_HYPERLINK_LIST=0×53;
   public static final int RC_PAGE=0×21;
   public static final int RC_FUNCTION=0×22;
   public static final int RC_FORWARD=0×23;
   public static final int RC_BACK='\b';
   public static final int RC_RELOAD=0×54;
   public static final int RC_STOP=0×13;
   public static final int RC_LEFT=0×25;
   public static final int RC_UP=0×26;
   public static final int RC_RIGHT=0×27;
   public static final int RC_DOWN=0×28;
   private int keyCode;
   public RCEvent(int kc) {keyCode=kc;}
   public int getKeyCode( ) {return keycode;}
}

Table 1 of the present invention shows a preferred exemplary embodiment of the programming language needed to place the web browser in the waiting for RC event mode 38 as shown in FIG. 1. Specifically, Table 1 is a class R.C. event written in the JAVA™ language. However, as stated above, other types of programming languages are not beyond the scope of the present invention. The program of Table 11 converts the signals transmitted by the remote control unit 30 into signals used by the web browser to activate various modes of the web browser. It is necessary that this remote control driver program and the web browser software must be able to coordinate with one another. With the program outlined by Table 1, the R.C. Handler packs the signal received from the R.C. driver by creating R.C. event objects where the messages in the queue maintained by the R.C. Handler are R.C. event objects.

Since the preferred embodiment of the present invention employs JAVA™, this language employs object-oriented programming technology that permits classifying of various functional objects on a web page. Typically, when a web browser downloads a web page, the browser parses the page into different class instances, and then records and displays it on the video device.

Figure 12:
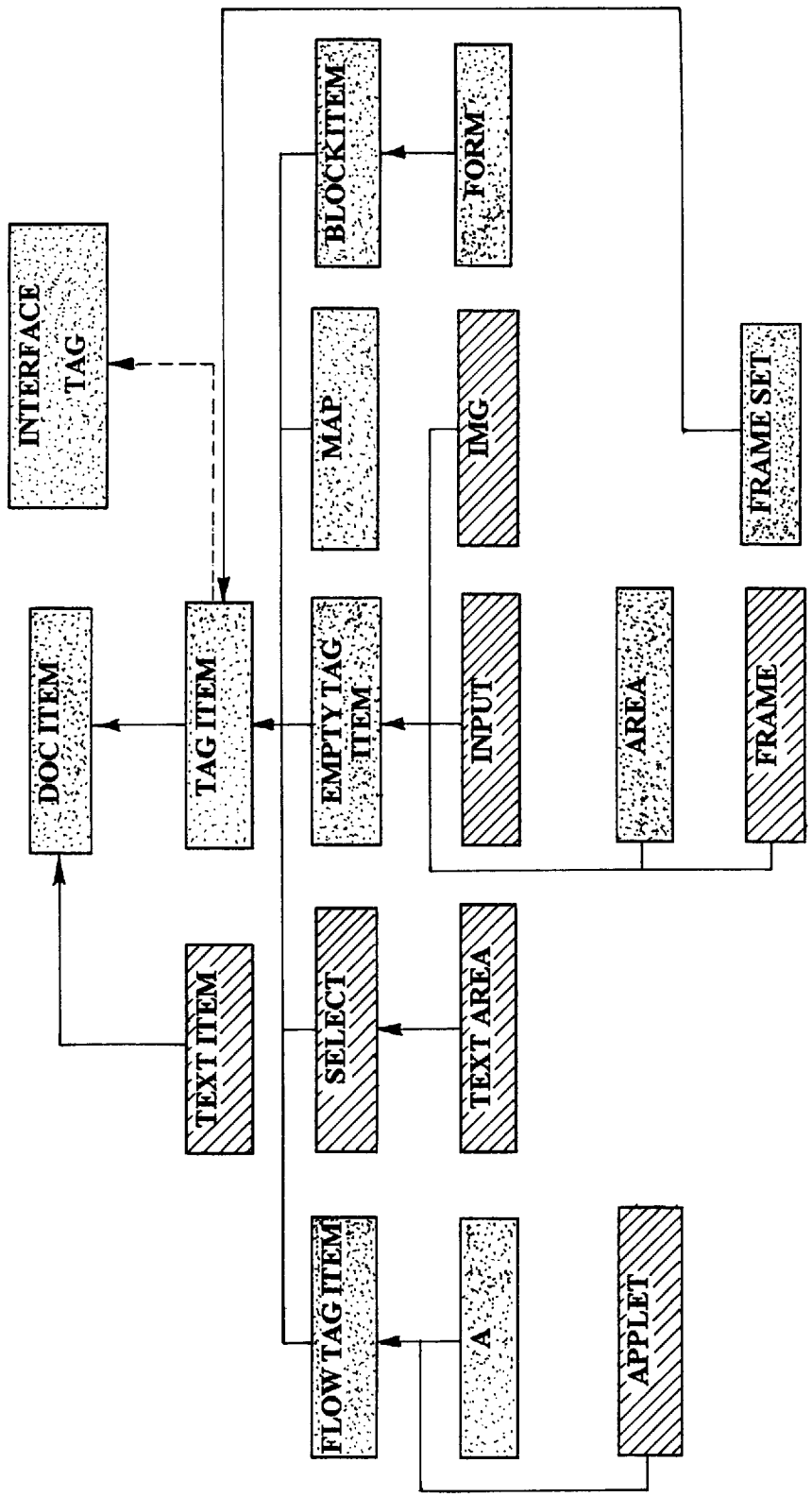
FIG. 12 shows an example of how objects in hypertext markup language are parsed by a web browser according to the present invention.

FIG. 12 shows a block diagram of how information of a web page is categorized. The present invention employs a Model View Controller (MVC) design pattern which is a way of partitioning the design of interactive software such as web browsers that interact with data of web pages. The "model" is the internal workings of the program (the algorithms), the "view" is how the user sees the state of the model and the "controller" is how the user changes the state or provides input. For the purpose of controlling meaningful components in web pages, MVC is employed to thoroughly analyze the syntax and semantics of a web page. FIG. 12 shows classes of data of a web page which are categorized according to the present invention. It is noted that the term hypertext markup language as used in the present invention is defined as a collection of formatting commands that create hypertext documents, web pages, to be exact. This language permits a user to point their web browser to a uniform or universal resource locator (URL), and to permit the browser to interpret the HTML commands embedded in the web page and use them to format the pages text and graphic elements. HTML commands cover many types of text formatting (bold and italic text, lists, headline fonts in various sizes, and so on), and also has the ability to include graphics and other non-text elements.

Table 2

<img sr="/Images/3c_1.gif" usemap="#3c_1" border=0>
<map name="3c_1">

```
<area shape="rect" coords="431,17,554,47"
href="/Text/ccl/org.html#d_page">
</map>
```

Table 2 provides the data structure of an image map. This data structure is programmed in the HTML language. In a web page, different images can be shown. Different areas of a web page can link to different places (URLs). Table 2 is an example of the syntax of an image map when writing in HTML.

Figure 13:
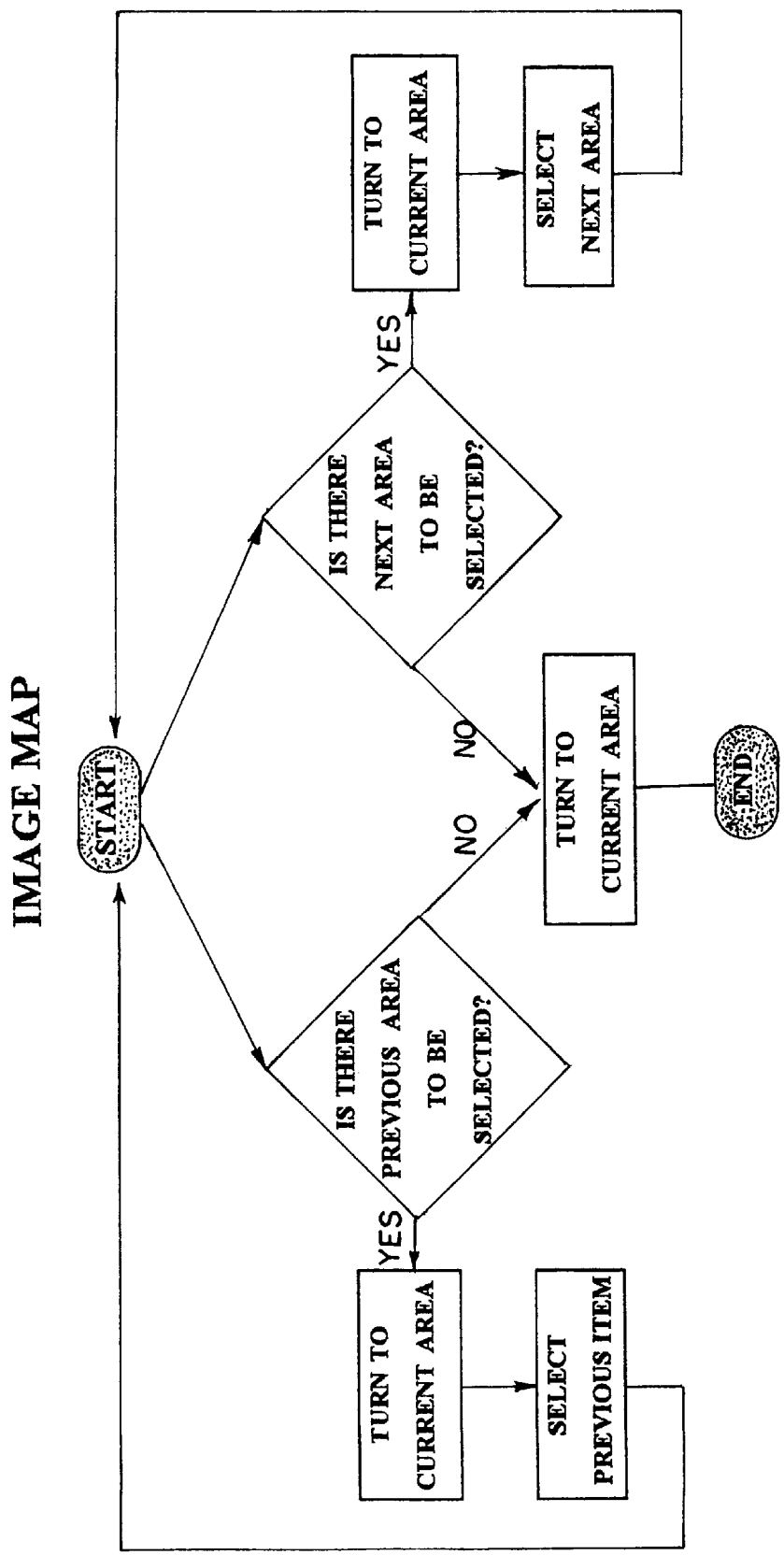
FIG. 13 shows a flowchart of image map selection for image maps on a web page according to the present invention.

FIG. 13 corresponds with the image program as outlined in Table 2. FIG. 13 is a flowchart of image map selection on a web page. FIG. 13 also describes how the browser program of the present invention switches between image areas in an image map to achieve the result in FIG. 6. When an image area is selected, the area is highlighted. When the "enter" user interface device is pressed, the browser program links to the URL if the highlighted area denotes a URL. This functioning is similar to controlling a browser program with a mouse, with the exception that the present invention controls components of a web page sequentially.

Table 3

```
<FORM ACTION="/cgi-bin/www/umldocs.cgi?download"
    ENCTYPE=x-www-form-encoded METHOD=POST>
    First Name:<INPUT TYPE="text" NAME="fname"
      SIZE=40 VALUE=""><BR>
    Country:<selectname=country><OPTION VALUE=
      'Please Select'>Please Select (listed alphabetically)
      <OPTION VALUE='AF'>AFGHANISTAN
      <OPTION VALUE='AL'>ALBANIA
<INPUT TYPE="radio" NAME="contactby" VALUE=
  "Yes"> Yes
<INPUT TYPE="radio" NAME="contactby" VALUE=
  "No"> No
<BR>
<TD><inputtype="checkbox" name="tool" value="C++
  >C++</TD>
<TD><inputtype="checkbox" name="tool" value=Visual
  Basic">Visual
Basic</TD>
<BR>
<INPUT TYPE="submit" Value="Submit"> <INPUT
  TYPE="Reset" VALUE="Reset">
</FORM>
```

Figures 14, 15:
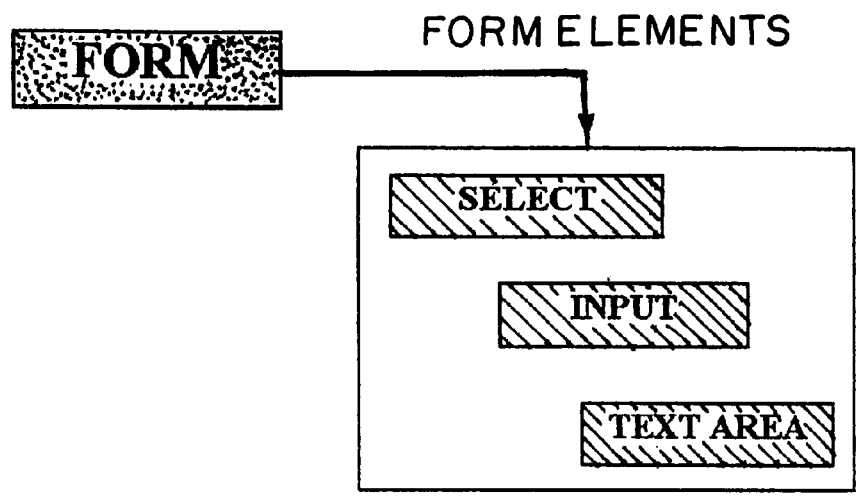
FIG. 14 shows an example of elements within a form on a web page according to the present invention.
FIG. 15 shows an exemplary screen format which is derived from a form in hypertext markup language.

Table 3 provides an exemplary embodiment of a form for a web page written in the HTML language. FIG. 14 schematically shows the elements of a form which typically include select functions, data input areas, and text areas. The actual format of a "form" on a web page is outlined by FIG. 15. FIG. 15 corresponds with the program outlined in Table 3 which is programmed in the HTML language.

Figure 16:
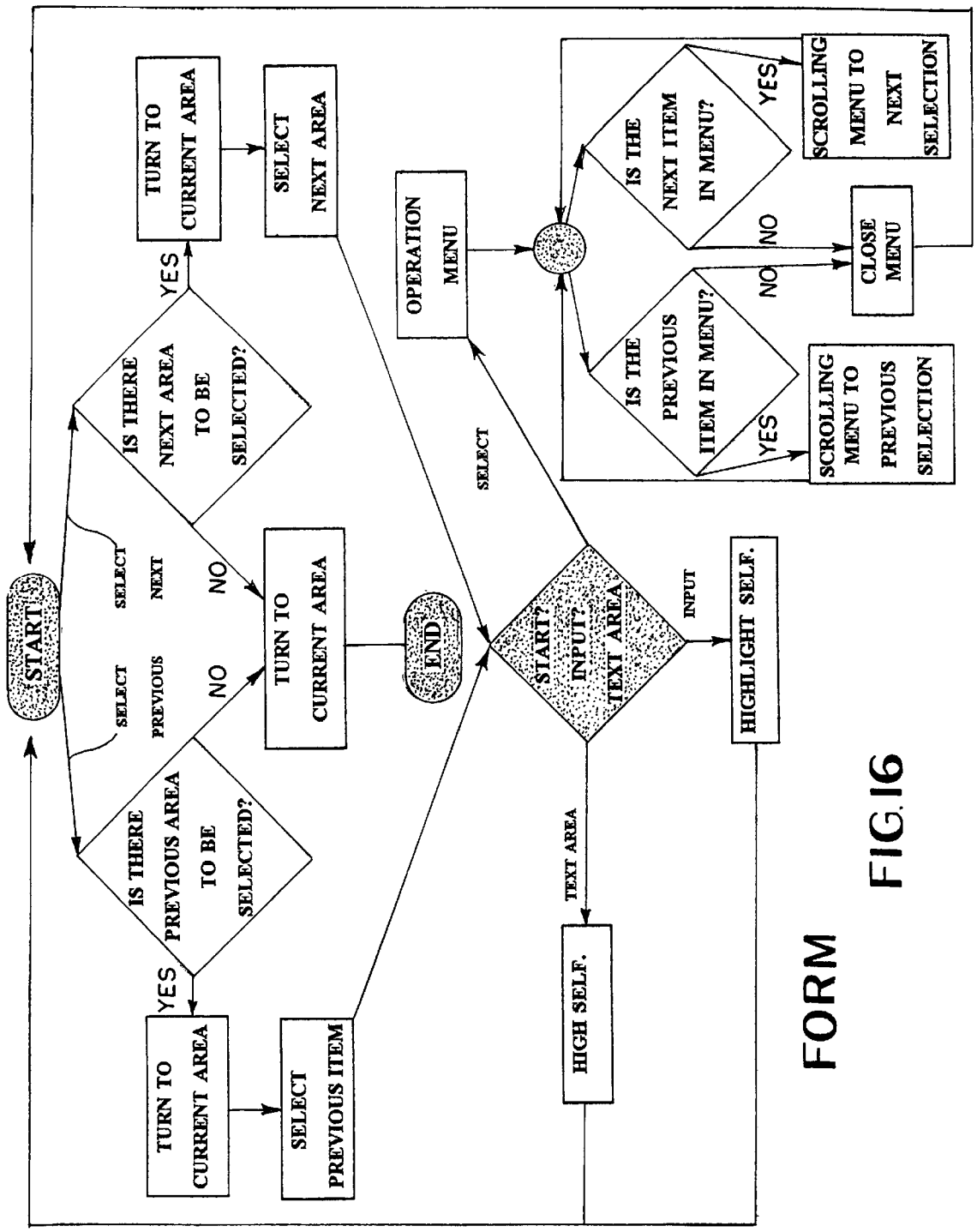
FIG. 16 is a flowchart of how data within a form is selected by the remote control unit of the present invention.

In FIG. 16, the flowchart of how data is entered and selected in a form is shown. This flowchart corresponds with the form program outlined by Table 3 and the actual form display shown by FIG. 15. The operation of controlling a windows operating system of a web browser program is intuitive. However, the present invention employs a remote controller with user interface devices such as a wheel 66 shown in FIG. 3. The present invention does not have a mouse cursor to locate a component on a web page such as a "choice list" or "menu". In the present invention, the Java AWT (Abstract Windowing Toolkit) has been modified to provide API's (Application Program Interfaces) for controlling the behavior or the AWT. For example, when a "choice list" or "menu" component on a web page is selected, the component is highlighted. When the "enter" user interface device is activated, the browser program opens the "choice list" or "menu" by calling the API titled "openChoice Menu . . . ". This is similar to how a "menu" or "choice" list operates when a cursor is placed on the "menu" or "choice list" and the user clicks on a mouse button to open the "choice list" or "menu". With the present invention, when the "choice list" is opened, the user can scroll through the list of data by activating the user interface device 66 which is preferably a wheel that is rotated clockwise or counterclockwise.

Figure 17:
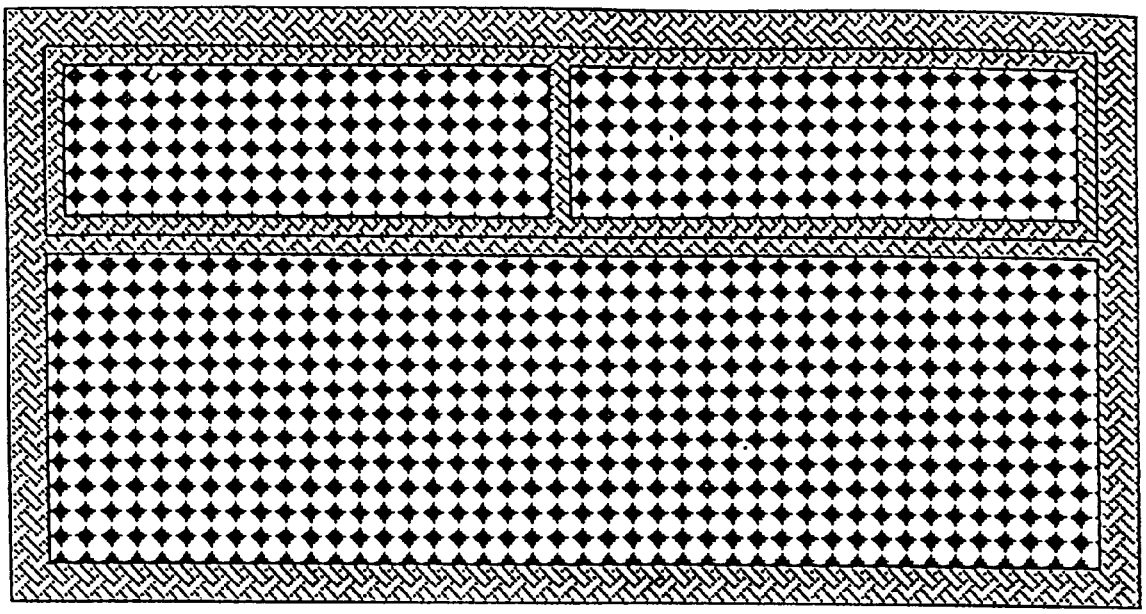
FIG. 17 shows an example of data frames for a web page according to the present invention.

Table 4 provides an exemplary embodiment of how to form a multi-frame web page by using the HTML language. FIG. 17 corresponds to a frame that would be the resultant output of the program set forth in Table 4.

Figure 18:
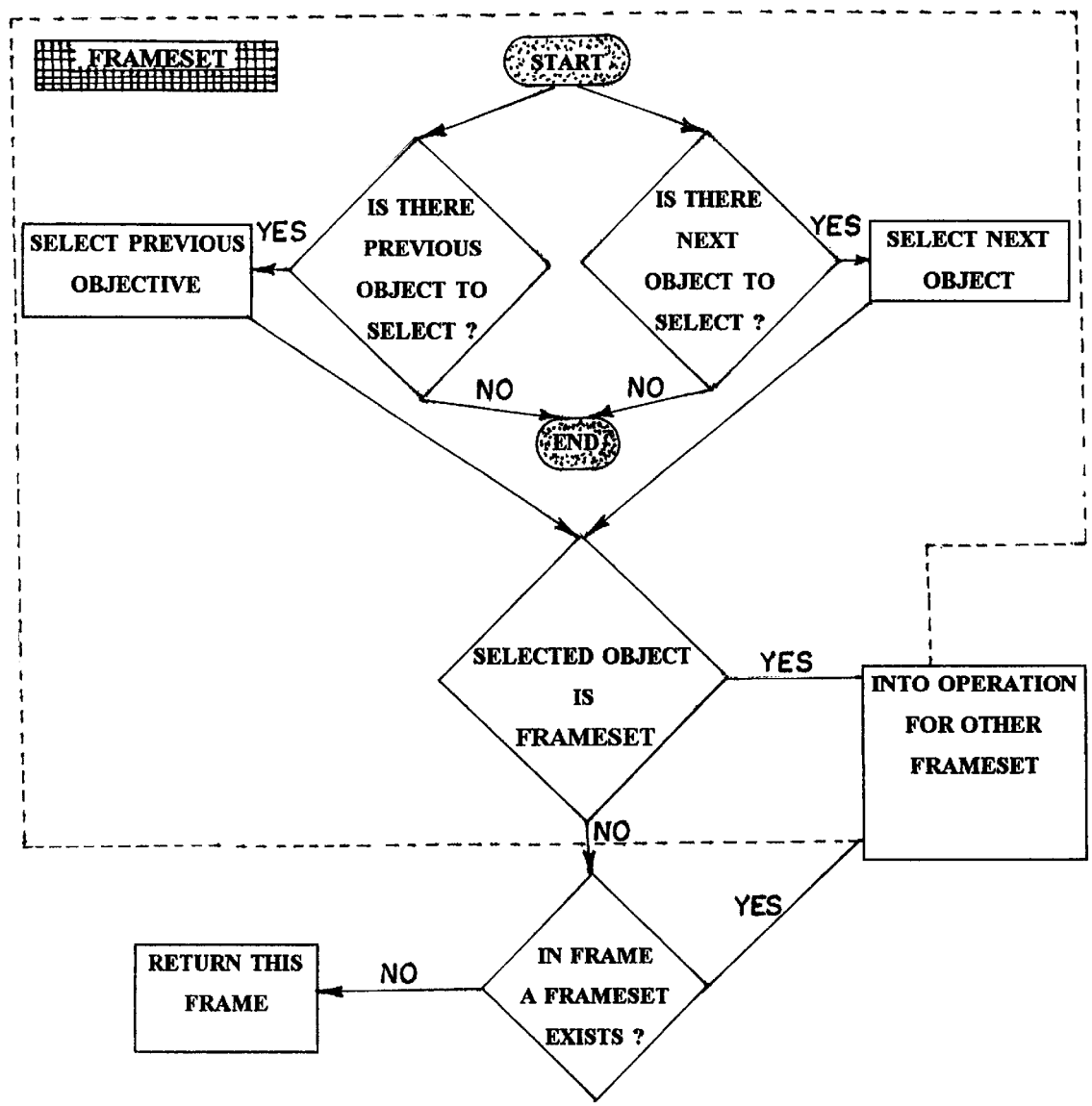
FIG. 18 shows a flowchart of how frames of a web page are selected by the remote control unit of the present invention.
Figure 19:
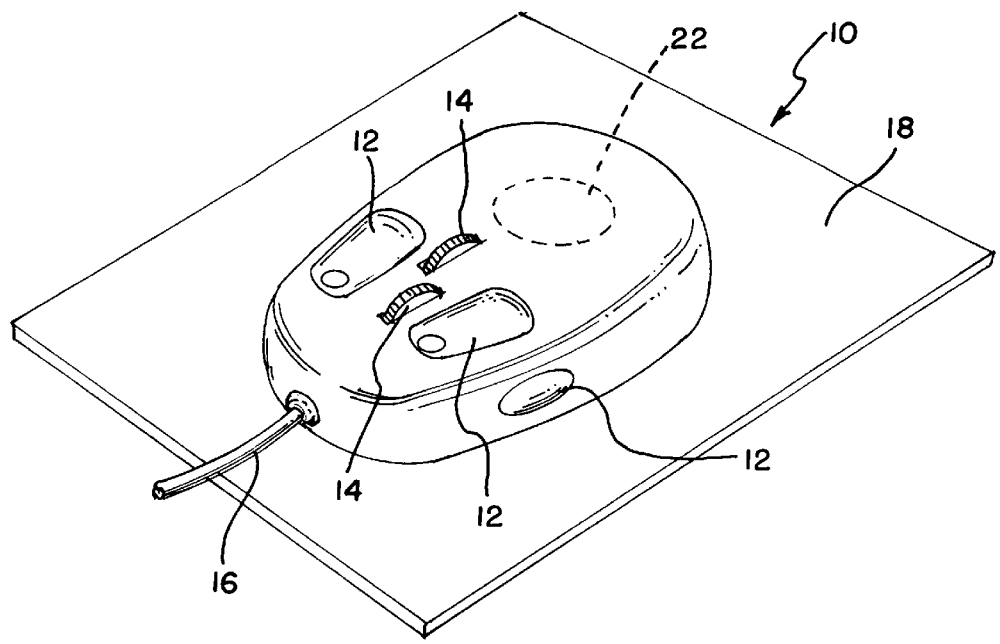
FIG. 19 shows a conventional mouse.
Figure 20:
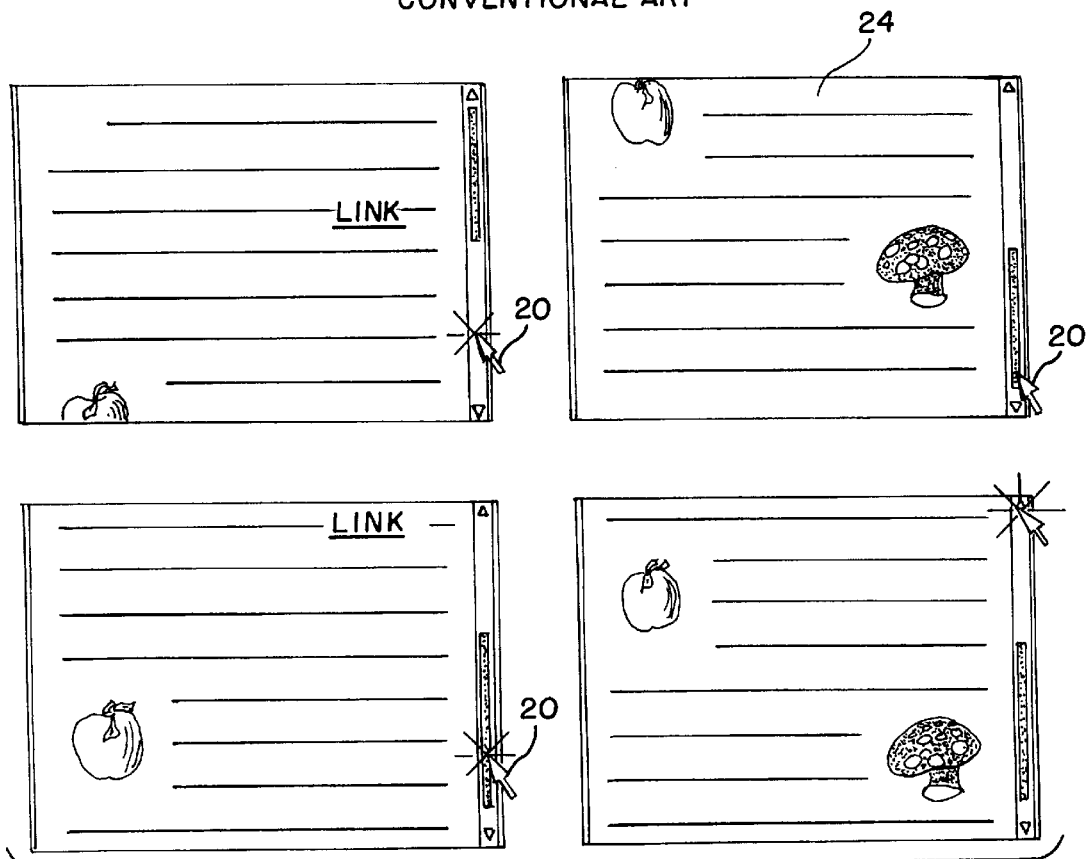
FIG. 20 shows the scrolling of a web page on a screen by using a mouse and a mouse pointer as set forth in the conventional art.

In FIG. 18, further details of the frame turning mode 46 are outlined by a flowchart. When multiple frames are displayed with the web browser program of the present invention, a user must select a right side oriented frame initially because the web browser program of the present invention does not employ a mouse cursor. In the frame turning mode, any activation of the user interface device 66 (which is preferably a wheel) controls the switching between frames on the web browser of the present invention. Components on a selected frame are switched by rotating user interface device 66. Switching between a frame-turning mode and a component-controlling mode is preferably accomplished by activating the "frame" user interface device 78 which is preferably a button on the remote control unit 30.

The present invention is preferably designed to operate a web browser which employs both JAVA™ and HTML languages. However, the present invention is not limited to these types of languages and can further include other languages which permit cross platform operation over the internet and the worldwide web. Other languages include, but are not limited to JAVA™ script, JAVABEANS, extensible markup language (XML) standardized generalized markup language (SGML), HTML programs which include a JAVA applet and virtual reality modeling language (VRML) and other like object-oriented programming languages.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for interacting and selecting information on video device without a mouse pointer, the apparatus comprising:

a remote control unit;

a video device;

a computer, said computer being operatively linked to the remote control unit via an interface;

a first user interface device disposed on said remote control unit, said first user interface device generating a signal upon actuation that activates information displayed on the video device outputted by said computer;

a second user interface device disposed on said remote control unit, said second user interface device generating a signal upon actuation that selects information displayed on the video device outputted by said computer;

a third user interface device disposed on said remote control unit, said third user interface device generating a signal upon actuation that scrolls information on the video device outputted by said computer;

a fourth user interface device disposed on said remote control unit, said fourth user interface device generating a signal upon actuation that advances information in a page format on said video device outputted by said computer;

a fifth user interface device disposed on said remote control unit, said fifth user interface device generating a signal upon actuation that regresses information in a page format on said video device outputted by said computer;

a sixth user interface device disposed on said remote control unit, said sixth user interface device generating a signal upon actuation that advances information incrementally on said video device outputted by said computer; and a seventh user interface device disposed on said remote control unit, said seventh user interface device generating a signal upon actuation that regresses information incrementally on said video device outputted by said computer, whereby efficiency in remote operation of a computer program which outputs information on the video device is substantially increased.

2. The system of claim 1, wherein said third user interface device includes a wheel structure.

3. The system of claim 2, wherein said first user interface device is disposed within a central region of said wheel structure, said first user interface device includes a substantially cylindrical structure.

4. The system of claim 1, wherein each interface device includes a switch which produces signals having individual characteristics recognizable by said computer.

5. The system of claim 1, wherein said first user interface device activates a hyperlink on a web page displayed on said video device.

6. The system of claim 1, wherein said second user interface device highlights a frame on a web page displayed on said video device.

7. The system of claim 1, wherein said third user interface device initiates scrolling through at least one of text and images on a web page displayed on said video device.

8. The system of claim 1, wherein said fourth user interface device initiates advancing through at least one of text and images in a page format on a web page displayed on said video device.

9. The system of claim 1, wherein the fifth interface device regresses through at least one of text and images in a page format on a web page displayed on said video device.

10. The system of claim 1, wherein the sixth interface device advances through at least one of text and image hyperlinks in increments on a web page displayed on said video device.

11. The system of claim 1, wherein the seventh interface device regresses through at least one of text and image hyperlinks in increments on a web page displayed on said video device.

12. The system of claim 1, wherein the seventh interface device highlights or unhighlights a hyperlink on a web page displayed on said video device.

13. A method executable in a computer system for interacting and selecting information on a video device without a mouse pointer, the method comprising the steps of:

detecting the activation of a user interface device on a remote control unit;

activating information displayed on the video device if a first interface device is actuated;

selecting information displayed on the video device if a second interface device is actuated;

scrolling through information on the video device by activating if a third interface device is actuated;

advancing through information in a page format if a fourth interface device is actuated;

regressing through information in a page format if a fifth interface device is actuated;

advancing through information incrementally if a sixth interface device is actuated; and regressing through information incrementally if a seventh interface device is activated, whereby efficiency in remote operation of the computer program which provides the information on the video device is substantially increased.

14. The method of claim 13, wherein the step of scrolling through information includes scrolling through at least one of text and images on a web page.

15. The method of claim 13, wherein the step of advancing through information in a page format includes advancing through at least one of text and images on a web page.

16. The method of claim 13, wherein the step of regressing through information in a page format includes regressing through at least one of text and images on a web page.

17. The method of claim 13, wherein the step of advancing through information incrementally includes at least one of highlighting or unhighlighting at least one of text and images on a web page.

18. The method of claim 13, wherein the step of regressing through information incrementally includes at least one of moving from one hyperlink to another hyperlink on a web page.

19. The method of claim 13, wherein the step of regressing through information incrementally includes at least one of highlighting or unhighlighting at least one of text and images on a web page.

20. The method of claim 13, wherein the step of advancing through information incrementally includes at least one of moving from one hyperlink to another hyperlink on a web page.

21. A method of interacting and selecting information on a video device without a mouse pointer, the method comprising the steps of:

providing a remote control unit;

providing a plurality of user interface devices on the remote control unit;

providing a video device;

operatively linking the remote control unit to a computer connected to the video device via a wireless interface;

activating information displayed on the video device by activating one of the interface devices;

selecting information displayed on the video device by activating one of the interface devices;

scrolling through information on the video device by activating one of the interface devices;

advancing through information in a page format by activating one of the interface devices;

regressing through information in a page format by activating one of the interface devices;

advancing through information incrementally by activating one of the interface devices; and regressing through information incrementally by activating one of the interface devices, whereby efficiency in remote operation of a computer program which provides the information on the video device is substantially increased.

22. The method of claim 21, wherein the step of operatively linking the remote control device to the video device includes providing a radio frequency link between the remote control device and the video device.

23. The method of claim 21, wherein the step of providing a video device includes providing a television set which is operatively linked to the remote control unit.

24. The method of claim 23, wherein the step of operatively linking the remote unit to the computer includes producing radio frequency signals having individual characteristics recognizable by the computer.

25. The method of claim 23, wherein the step of activating information includes activating a hyperlink on a web page.

26. The method of claim 23, wherein the step of scrolling through information includes scrolling through at least one of text and images on a web page.

27. The method of claim of claim 26, wherein the step of scrolling through information further includes controlling a scroll rate with a wheel shaped user interface device and rotating said wheel shaped user interface device to initiate scrolling through said information.

28. The method of claim 23, where wherein the step of advancing through information in a page format includes advancing through at least one of text and images on a web page.

29. The method of claim 23, wherein the step of regressing through information in a page format includes regressing through at least one of text and images on a web page.

30. The method of claim 23, wherein the step of advancing through information incrementally includes at least one of highlighting or unhighlighting at least one of text and images on a web page.

31. The method of claim 23, wherein the step of advancing through information incrementally includes at least one of moving from one hyperlink to another hyperlink on a web page.

32. The method of claim 23, wherein the step of regressing through information incrementally includes at least one of highlighting or unhighlighting at least one of text and images on a web page.

33. The method of claim 23, wherein the step of regressing through information incrementally includes at least one of moving from one hyperlink to another hyperlink on a web page.

* * * * *